(12) United States Patent
Bruckmeier et al.

(10) Patent No.: US 10,111,446 B2
(45) Date of Patent: Oct. 30, 2018

(54) FATTY ACID VINYL ESTER COPOLYMERS WITH WAX QUALITIES

(71) Applicant: Wacker Chemie AG, Munich (DE)

(72) Inventors: Christian Bruckmeier, Munich (DE); Barbara Moser, Gauting (DE); Marina Bareuther, Albaching (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 15/321,183

(22) PCT Filed: Jul. 10, 2015

(86) PCT No.: PCT/EP2015/065915
§ 371 (c)(1),
(2) Date: Dec. 21, 2016

(87) PCT Pub. No.: WO2016/008829
PCT Pub. Date: Jan. 21, 2016

(65) Prior Publication Data
US 2017/0208828 A1 Jul. 27, 2017

(30) Foreign Application Priority Data
Jul. 14, 2014 (DE) .......... 10 2014 213 657

(51) Int. Cl.
| | | |
|---|---|---|
| C08F 218/10 | (2006.01) | |
| A23C 19/16 | (2006.01) | |
| A23P 20/00 | (2016.01) | |
| C09D 131/02 | (2006.01) | |
| C08F 220/10 | (2006.01) | |
| C08F 220/18 | (2006.01) | |
| C08F 220/56 | (2006.01) | |
| C08L 33/06 | (2006.01) | |

(52) U.S. Cl.
CPC .......... *A23C 19/163* (2013.01); *A23P 20/19* (2016.08); *C08F 218/10* (2013.01); *C09D 131/02* (2013.01); *C08F 220/10* (2013.01); *C08F 220/18* (2013.01); *C08F 220/56* (2013.01); *C08L 33/06* (2013.01)

(58) Field of Classification Search
USPC .................. 526/525, 325; 523/100
See application file for complete search history.

(56) References Cited

U.S. PATENT DOCUMENTS

| | | | |
|---|---|---|---|
| 2,600,384 A | 6/1952 | Bauer et al. | |
| 3,475,321 A * | 10/1969 | Henselman ............ | C10G 21/00 208/33 |
| 3,646,077 A * | 2/1972 | Hubner et al. .......... | C07C 67/04 554/161 |
| 3,689,445 A * | 9/1972 | Hopwoof et al. ... | C09D 123/02 524/503 |
| 2005/0070653 A1* | 3/2005 | Apitz ................... | C04B 40/0039 524/417 |
| 2005/0107515 A1 | 5/2005 | Jakob et al. | |
| 2005/0154123 A1* | 7/2005 | Jakob ................. | A22C 13/0013 524/804 |
| 2010/0227995 A1 | 9/2010 | Kohler | |
| 2013/0156901 A1 | 6/2013 | Pennarun | |

FOREIGN PATENT DOCUMENTS

| | | |
|---|---|---|
| EP | 1541600 A1 | 6/2005 |
| JP | 57120931 A | 7/1982 |
| JP | 2011510099 A | 3/2011 |
| WO | 03054041 A1 | 7/2003 |

OTHER PUBLICATIONS

International Search Report for PCT/EP2015/065915 dated Oct. 6, 2015.
English language abstract for JP 57120931 A (1982).

\* cited by examiner

*Primary Examiner* — Tae H Yoon
(74) *Attorney, Agent, or Firm* — Caesar Rivise, PC

(57) ABSTRACT

Subject-matter of the invention are processes for preparing fatty acid vinyl ester copolymers by radically initiated polymerization of a) one or more vinyl esters of carboxylic acids having 16 to 22 carbon atoms and b) one or more vinyl esters of carboxylic acids having 2 to 15 carbon atoms, with one or more vinyl esters a) and one or more vinyl esters b) being metered in during the polymerization, characterized in that during the polymerization either the metering rate of vinyl ester a) or the metering rate of vinyl ester b) is reduced and the metering rate of the other of the two vinyl esters, a) or b), is increased.

18 Claims, No Drawings

FATTY ACID VINYL ESTER COPOLYMERS WITH WAX QUALITIES

The invention relates to a method for preparing fatty acid vinyl ester copolymers, the fatty acid vinyl ester copolymers and copolymer compositions thus obtained and also the use thereof in coating compositions, in particular for preparing food coatings, or in chewing gum raw materials or in the cosmetic field.

There has been an increasing trend for some years to substitute conventional petrochemical polymers by products based on renewable resources. The substitution of paraffin waxes by fatty acid vinyl ester copolymers is an example of this. A requirement, however, is that the performance properties of paraffin waxes are achieved. For instance, the copolymers must have the fusibility required for processing and coatings prepared therefrom must not be sticky or brittle but must exhibit wax-like properties with an even temperature-hardness profile.

The fatty acid vinyl ester copolymers known to date do not sufficiently satisfy this requirement profile. Conventional copolymers with random distribution of different vinyl ester units in the polymer chains have a sharp melting point and are partially liquid to viscous above this melting point but are hard and brittle below this melting point and therefore cannot compete with the wax qualities of paraffin waxes. Examples of such random copolymers of vinyl esters of long-chain carboxylic acids and vinyl esters of short-chain carboxylic acids are described in U.S. Pat. No. 2,600,384.

In order to set the desired softness and plasticity of wax formulations, two homopolymers of different fatty acid vinyl esters and optionally additional cohesion polymers are mixed in conventional preparations to give a waxy coating composition. However, such preparations tend over time to separation of the various polymers and to a brittleness of the coating. Brittle coatings no longer have the desired waxy properties. A hypothetical addition of soft polymers, which should counteract the brittleness, further increases the separation problem and can lead moreover to coatings with sticky surfaces.

To remedy such problems with wax coatings for food, US 2013/0156901 recommends block copolymers of long-chain and short-chain vinyl esters. However, the copolymers described therein may still be unsatisfactory with respect to the elastic and waxy properties of the coatings obtained therefrom and the temperature-independence of the property profile of the products. Here also aggregation or superstructure formation of different polymer phases may take place and brittleness may occur with loss of wax-like properties of the corresponding coatings, for example. Moreover, it is complex to prepare block copolymers by means of so-called living polymerization, for example by controlled radical polymerization (CRP) such as reversible addition fragmentation chain transfer (RAFT) or transfer radical polymerization (ATRP). This applies particularly to polymerization of vinyl esters of long-chain carboxylic acids and vinyl esters of short-chain carboxylic acids.

The object therefore was to provide fatty acid vinyl ester copolymers with wax-like properties in which one or more of the disadvantages mentioned above can be at least reduced or even completely eliminated.

Surprisingly, the object was achieved characterized in that, in the preparation of fatty acid vinyl ester copolymers by means of polymerization, at least one vinyl ester a) of carboxylic acids having 16 to 22 carbon atoms and at least one vinyl ester b) of carboxylic acids having 2 to 15 carbon atoms were metered in during the polymerization in a very specific manner. The metered addition rates of the vinyl esters a) and b) were altered inversely during the polymerization; i.e. either the metered addition rate of vinyl ester a) or the metered addition rate of vinyl ester b) was increased during the polymerization, and the metered addition rate of the other vinyl ester was reduced during the polymerization. In this manner, specific gradient copolymers were obtained which, due to this metering scheme, have neither the structural features of block copolymers nor of conventional random copolymers.

The invention relates to methods for preparing fatty acid vinyl ester copolymers by free-radical initiated polymerization of a) one or more vinyl esters of carboxylic acids having 16 to 22 carbon atoms and
b) one or more vinyl esters of carboxylic acids having 2 to 15 carbon atoms, wherein one or more vinyl esters a) and one or more vinyl esters b) are metered in during the polymerization, characterized in that during the polymerization either the metered addition rate of vinyl ester a) or the metered addition rate of vinyl ester b) is reduced and the metered addition rate of the other of the two vinyl esters a) or b) is increased.

The invention further relates to fatty acid vinyl ester copolymers obtainable by the aforementioned method.

Vinyl esters can also be formally referred to as carboxylic esters of vinyl alcohol and accordingly bear a carboxylic acid residue. The carboxylic acid residues may be branched but are preferably unbranched. The number of carbon atoms of the carboxylic acid residue is preferably even-numbered. The carboxylic acid residues are preferably saturated. The carboxylic acid residues therefore preferably do not bear any ethylenically unsaturated groups. In vinyl esters a) and b), the respective carboxylic acid residues may have the above definitions independently of each other. The aforementioned carboxylic acid residues affect advantageously the wax properties of the fatty acid vinyl ester copolymers according to the invention.

Preference is given to vinyl esters a) of carboxylic acids having 16 to 18 carbon atoms. Examples of carboxylic acids of vinyl esters a) are palmitic acid, stearic acid, margaric acid, arachidic acid or behenic acid. Preference is given to palmitic acid and stearic acid. Preference is also given to comonomer mixtures of vinyl esters a) comprising vinyl palmitate and vinyl stearate.

The vinyl esters a) are preferably used from 20 to 90% by weight, particularly preferably 40 to 80% by weight and most preferably 60 to 80% by weight, in each case based on the total mass of the sum total of ethylenically unsaturated monomers used for preparing the fatty acid vinyl ester copolymers.

Preferred vinyl esters b) are vinyl esters of carboxylic acids having 2 to 14 carbon atoms. Particular preference is given to vinyl esters b) of carboxylic acids having 2 to 9 carbon atoms, particularly 2 to 5 carbon atoms. Particular preference is also given to vinyl esters b) of carboxylic acids having 10 to 14 carbon atoms, particularly 10 to 12 carbon atoms.

Examples of vinyl esters b) are vinyl acetate, vinyl propionate, vinyl butyrate, 1-methylvinyl acetate, vinyl pivalate, vinyl laurate, vinyl neodecanoate, vinyl esters of α-branched monocarboxylic acids having 9 to 11 carbon atoms, such as VeoVa9® or VeoVa10® (both trade names of Momentive). Preferred vinyl esters b) are vinyl propionate, vinyl butyrate, VeoVa9® and particularly vinyl acetate.

Preferred vinyl esters b) are also VeoVa10® and particularly vinyl laurate. Particular preference is given to vinyl acetate and especially vinyl laurate.

Also preferred are comonomer mixtures of vinyl esters b) comprising vinyl acetate and one or more further vinyl esters b) of carboxylic acids having 9 to 14 carbon atoms, in particular 10 to 12 carbon atoms. Particular preference is given to comonomer mixtures of vinyl esters b) comprising vinyl acetate and vinyl laurate. The proportion of vinyl acetate in such comonomer mixtures is preferably ≤50% by weight, particularly preferably ≤30% by weight and most preferably ≤10% by weight, each based on the total weight of the vinyl esters b). In this manner, for example, the compatibility of the fatty acid vinyl ester copolymers with the further constituents of the application formulation can be controlled.

The vinyl esters b) are preferably used from 10 to 80% by weight, particularly preferably 20 to 60% by weight and most preferably 20 to 40% by weight, in each case based on the total mass of the sum total of ethylenically unsaturated monomers used for preparing the fatty acid vinyl ester copolymers.

To prepare the fatty acid vinyl ester copolymers, one or more further ethylenically unsaturated monomers can be used. Further ethylenically unsaturated monomers can be selected, for example, from the group comprising acrylic esters and methacrylic esters of unbranched or branched alcohols having 1 to 15 carbon atoms, vinyl aromatic compounds, vinyl halides, olefins and dienes.

Examples of acrylic esters or methacrylic esters are methyl acrylate, methyl methacrylate, ethyl acrylate, ethyl methacrylate, propyl acrylate, propyl methacrylate, n-, iso- and t-butyl acrylate, n-, iso- and t-butyl methacrylate, 2-ethylhexyl acrylate, norbornyl acrylate, isobornyl acrylate and stearyl acrylate. Preferred acrylic esters or methacrylic esters are methyl acrylate, methyl methacrylate, n-, iso- and t-butyl acrylate, 2-ethylhexyl acrylate and isobornyl acrylate. As vinyl aromatic compounds, styrene or vinyltoluene may be copolymerized. From the group of vinyl halides, vinyl chloride, vinylidene chloride or vinyl fluoride, preferably vinyl chloride, are typically used. Examples of olefins are ethene and propene; a suitable diene is butadiene for example.

The further ethylenically unsaturated monomers are preferably used from 1 to 15% by weight and particularly preferably 1 to 5% by weight, in each case based on the total mass of the sum total of ethylenically unsaturated monomers used for preparing the fatty acid vinyl ester copolymers. Most preferably, no further ethylenically unsaturated monomers are used.

Optionally, 0.05 to 10% by weight, based on the total weight of the ethylenically unsaturated monomers, of auxiliary monomers may be copolymerized. By way of preference, no auxiliary monomers are copolymerized. Examples of auxiliary monomers are ethylenically unsaturated mono- and dicarboxylic acids, preferably ethylenically unsaturated carboxylic acids such as acrylic acid, methacrylic acid, fumaric acid and maleic acid; ethylenically unsaturated carboxamides and -nitriles, preferably acrylamide and acrylonitrile; mono- and diesters of fumaric acid and maleic acid such as the diethyl and diisopropyl esters, and also maleic anhydride, ethylenically unsaturated sulfonic acids and salts thereof, preferably vinylsulfonic acid, 2-acrylamido-2-methylpropanesulfonic acid. Further examples are precrosslinking comonomers such as polyethylenically unsaturated comonomers, for example divinyl adipate, diallyl maleate, allyl methacrylate or triallyl cyanurate, or postcrosslinking comonomers, for example acrylamidoglycolic acid (AGA), methyl methacrylamidoglycolate (MAGME), N-methylolacrylamide (NMA), N-methylolmethacrylamide (NMMA), N-methylolallylcarbamate, alkyl ethers such as the isobutoxy ethers or esters of N-methylolacrylamide, of N-methylolmethacrylamide and of N-methylol allylcarbamate. Also suitable are epoxide-functional comonomers such as glycidyl methacrylate and glycidyl acrylate. Further examples are silicon-functional comonomers such as acryloxypropyltri(alkoxy)silanes and methacryloxypropyltri(alkoxy)silanes, vinyltrialkoxysilanes and vinylmethyldialkoxysilanes, in which, for example, methoxy, ethoxy and ethoxypropylene glycol ether residues may be present as alkoxy groups. Also included are monomers having hydroxyl or CO groups, for example hydroxyalkyl esters of methacrylic acid and acrylic acid such as hydroxyethyl, hydroxypropyl or hydroxybutyl acrylate or methacrylate and also compounds such as diacetone acrylamide and acetylacetoxyethyl acrylate or methacrylate.

Fatty acid vinyl ester copolymers are prepared preferably by the mass polymerization method and particularly preferably by the solution polymerization method.

Suitable organic solvents are, for example, aldehydes such as acetaldehyde, propionaldehyde and butyraldehyde; ketones such as acetone or methyl ethyl ketone; esters such as methyl acetate, ethyl acetate and butyl acetate; or alcohols such as methanol, ethanol, propanol, isopropanol. Preference is given to monohydric aliphatic alcohols having 1 to 6 carbon atoms. Particular preference is given to methanol, ethanol and especially isopropanol. The organic solvents preferably have a boiling point in the range of 60 to 100° C. (determined at a pressure of 1013 mbar). Water or a mixture of water and one or more organic solvents may also optionally be used. The proportion of water is preferably ≤5% by weight, based on the total weight of the solvents. With particular preference, no water is added as solvent.

The polymerization is generally carried out under reflux conditions, preferably at a temperature of 40° C. to 160° C., particularly preferably at 40° C. to 100° C. This may be conducted as usual at standard pressure, positive pressure or negative pressure. In the copolymerization of gaseous comonomers such as ethylene, the process is preferably operated at elevated pressures, in general at 5 to 150 bar. If the reaction is carried out at standard pressure, it is advantageous to supply a slight positive pressure to the reaction system at the end of the reaction, preferably 0.5 to 3 bar, in order to be able to supply energy to the system externally to maximize temperature and conversion, and in order to render most effectively the removal by distillation of the residual monomers and solvent.

Organic peroxides or azo compounds are preferably used as initiators. Suitable initiators are, for example, diacyl peroxides such as dilauroyl peroxide, peroxoesters such as t-butyl peroxopivalate or t-butyl peroxo-2-ethylhexanoate, or peroxodicarbonates such as diethyl peroxodicarbonate. The amount of initiator is generally from 0.01 to 5.0% by weight, based on the total weight of the monomers. The initiators can either be pre-charged or be metered in. It has proven worthwhile in this case to initially charge a proportion of the amount of initiator required and to meter in the remainder continuously during the polymerization.

The polymerization can also be effected in the presence of protective colloids and/or emulsifiers. Protective colloids and/or emulsifiers are preferably used in amounts of ≤5% by weight, particularly ≤0.5% by weight, based on the total amount of ethylenically unsaturated monomers used. Particular preference is given to polymerization in the absence of protective colloids. Particular preference is also given to polymerization in the absence of emulsifiers. This is advantageous in terms of achieving the object according to the invention.

Examples of protective colloids are polyvinyl alcohols; polyvinylpyrrolidones; polyvinyl acetals; polysaccharides; proteins; lignin sulfonates; synthetic polymers such as poly(meth)acrylic acid, copolymers of (meth)acrylates with carboxyl-functional comonomer units, poly(meth)acrylamide, polyvinylsulfonic acids and water-soluble copolymers thereof; melamine formaldehyde sulfonate, naphthalene formaldehyde sulfonate, styrene/maleic acid copolymers and vinyl ether/maleic acid copolymers. Examples of emulsifiers are anionic surfactants such as alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl- or alkylarylsulfonates having 8 to 18 carbon atoms, esters and semi-esters of sulfosuccinic acid with monohydric alcohols or alkylphenols, or nonionic surfactants such as alkyl polyglycol ethers or alkylaryl polyglycol ethers having 8 to 40 ethylene oxide units.

To prepare the fatty acid vinyl ester copolymers, a semibatch process may be operated for example, wherein individual components or two or more components are initially charged and the remainder is metered in, or a continuous polymerization can be carried out wherein the components are metered in during the polymerization. The metered addition can optionally be carried out separately (spatially and temporally).

Essential to the invention is that one or more vinyl esters a) and one or more vinyl esters b) are metered in during the polymerization, wherein during the polymerization either the metered addition rate of vinyl ester a) or the metered addition rate of vinyl ester b) is reduced and the metered addition rate of the other of the two vinyl esters is increased.

The expression during the polymerization generally refers to a period during which the polymerization of ethylenically unsaturated monomers, in particular vinyl esters a) or vinyl esters b), takes place. The polymerization starts in general after or with the addition of initiators and ethylenically unsaturated monomers. As is well known, the start of the polymerization is identifiable by the heating of the polymerization mixture which occurs due to the exothermicity of the polymerization reaction. At the end of the polymerization, ethylenically unsaturated monomers, in particular vinyl esters a) or b), are in general no longer, or substantially no longer polymerized. At the end of the polymerization, the amount of unpolymerized ethylenically unsaturated monomers, in particular the unpolymerized vinyl esters a) and b), is $\leq 10\%$ by weight, particularly preferably $\leq 5\%$ by weight, more preferably $\leq 3\%$ by weight and most preferably $\leq 1\%$ by weight, each based on the total weight of the sum total of monomers used, in particular the sum total of vinyl esters a) and b) used.

Here, the vinyl esters a) and/or b) can be metered in several addition steps or preferably continuously, i.e. without interruption. Alternatively, the continuous metered addition of vinyl esters a) and/or vinyl esters b) may also be interrupted and be resumed again at a later time point. Alternatively, it is also possible to meter in partial amounts of the vinyl esters a) and/or partial amounts of the vinyl esters b) continuously and to meter in the remaining amounts of vinyl esters a) and/or vinyl esters b) in one or more steps.

The metering addition rate, as customary, refers to the amount of a vinyl ester added over a period of time during the polymerization.

In the method according to the invention, the amount added of one of the two vinyl esters a) and vinyl esters b) is reduced during the polymerization. During the polymerization, either vinyl ester a) or vinyl ester b) are metered in with a decreasing gradient. The other of the two vinyl esters a) and b) is metered in with an increasing gradient. The vinyl esters a) and the vinyl esters b) are metered in during the polymerization with opposing gradients or inverse metered addition rates or amounts added per unit time. With particular preference, the vinyl esters a) are metered in with a decreasing gradient and the vinyl esters b) are metered in with an increasing gradient during the polymerization. The metered addition rate of vinyl ester a) is preferably reduced during the polymerization, particularly preferably constantly or continuously reduced. The metered addition rate of vinyl ester b) is preferably increased during the polymerization, particularly preferably constantly or continuously increased. Alternatively, the metered addition rate of vinyl ester a) may be reduced during the polymerization, preferably may be constantly or continuously reduced. Alternatively, the metered addition rate of vinyl ester b) may also be increased during the polymerization, particularly preferably may be constantly or continuously increased.

For example, at the start of the polymerization, a larger amount of vinyl ester b) than of vinyl ester a) may be metered in. At the start of the polymerization, preferably a larger amount of vinyl ester a) than of vinyl ester b) is metered in.

The vinyl ester a) or b), whose metered addition rate is reduced during the polymerization, is also referred to as vinyl ester V1). The vinyl ester a) or b), whose metered addition rate is increased during the polymerization, is also referred to as vinyl ester V2). The vinyl ester a) is preferably vinyl ester V1). The vinyl ester b) is preferably vinyl ester V2).

With preference, 15 to 50% by weight, particularly preferably 15 to 30% by weight of the total vinyl esters V1) used are metered in up to the time point at which 1 to 10% by weight of the total vinyl esters V2) used have been metered in. With preference, 30 to 70% by weight, particularly preferably 35 to 50% by weight of the total vinyl esters V1) used are metered in up to the time point at which 20 to 30% by weight of the total vinyl esters V2) used have been metered in. With preference, 40 to 80% by weight, particularly preferably 50 to 60% by weight of the total vinyl esters V1) used are metered in up to the time point at which 40 to 60% by weight of the total vinyl esters V2) used have been metered in. With preference, 50 to 80% by weight, particularly preferably 55 to 70% by weight of the total vinyl esters V1) used are metered in up to the time point at which 60 to 70% by weight of the total vinyl esters V2) used have been metered in.

The vinyl esters a) and the vinyl esters b) can be wholly or partially metered in together in terms of time, optionally together in terms of space, preferably separated spatially. By way of preference, 70 to 100% by weight, particularly preferably 80 to 100% by weight of the total vinyl esters V1) used are metered in while vinyl esters V2) are being metered in. By way of preference, 80 to 100% by weight, particularly preferably 70 to 100% by weight of the total vinyl esters V2) used are metered in while vinyl esters V1) are being metered in.

It is also possible to initially charge one or more vinyl esters a) and/or one or more vinyl esters b). Preferably one such vinyl ester is initially charged which, at the start of the polymerization, is metered in at the greater metered addition rate. Preferably, vinyl ester a) is initially charged. The proportion of initially charged vinyl esters V1) is preferably 0 to 30% by weight, particularly 0 to 20% by weight, based on the total weight of the total vinyl esters V1) used. The proportion of initially charged vinyl esters V2) is preferably 0 to 30% by weight, based on the total weight of the total vinyl esters V2) used. Preferably, no vinyl ester V2) is initially charged. Particular preferably, none of the two vinyl esters a) and b) is initially charged.

After completion of the polymerization, residual monomers and optionally solvent can be removed by distillation according to known methods. For this purpose, the internal temperature can be increased up to 100° C. to 200° C. and subsequently a vacuum can be applied.

After completion of the polymerization, another post-polymerization is preferably carried out. During the post-polymerization, remaining amounts of residual monomer are polymerized. The post-polymerization is carried out by applying known methods, generally using redox catalyst-initiated post-polymerization.

Volatile compounds, such as residual monomers or impurities from initiator components or other raw materials, may also be removed by distillation or stripping. On stripping, optionally under reduced pressure, while passing inert training gases through or over, such as air, nitrogen or water vapor, volatile compounds are removed from the dispersions.

The fatty acid vinyl ester copolymers, as a result of their preparation in accordance with the invention, in particular the metered addition of the vinyl esters a) and b) in accordance with the invention, are characterized by specific structural features. The fatty acid vinyl ester copolymers are preferably gradient polymers. In the polymer chains of fatty acid vinyl ester copolymers, there is preferably therefore a gradient in the distribution of the units of vinyl esters a) and b) along the polymer chains. Due to their inherent structural features, the fatty acid vinyl ester copolymers according to the invention are in general not block copolymers. The fatty acid vinyl ester copolymers may also be described as random polymers having specific arrangement or specific enrichment of the different vinyl ester units along the polymer chains. The vinyl ester which is added at a higher metering rate at the relevant time point is preferably incorporated into the growing polymer chain at this time point. The decreasing metered addition of one vinyl ester or increasing metered addition rate of the other vinyl ester accordingly shifts this preference of monomer incorporation during the polymerization in favor of the vinyl ester with increasing metered addition rate.

The fatty acid vinyl ester copolymers are preferably semi-crystalline. Semi-crystalline means that only part of the polymer chains of the fatty acid vinyl ester copolymers is present in crystalline form.

The congealing point (immobilizing point) of the fatty acid vinyl ester copolymers is preferably ≥20° C., particularly preferably 30° C. to 80° C. and most preferably 40° C. to 75° C. (determination according to ASTM D938-12)

The melting point of the fatty acid vinyl ester copolymers is preferably ≥0° C., particularly preferably 10° C. to 50° C. and most preferably 15° C. to 45° C. (determination by differential scanning calorimetry (DSC) according to DIN EN ISO 11357-3 using the DSC 1 instrument from Mettler Toledo, module type: DSC1/500 (module name: DSC1_1448)).

As customary, the maximum of the melting point distribution curve and, in the presence of several maxima, the highest maximum of the melting point distribution curve, is specified as melting point (determination according to DIN EN ISO 11357-3). The fatty acid vinyl ester copolymers generally do not have unique melting points, but are characterized by a broad melting point distribution curve; i.e. the melting process takes place over a wide temperature range for substantial numbers of the fatty acid vinyl ester copolymers. Such a melting point distribution curve is advantageous for achieving the object according to the invention.

The enthalpy of fusion is determined as described in DIN EN ISO 11357-3. In accordance with DIN EN ISO 11357-3, the enthalpy of fusion is obtained as the area between the base line and the curve of the enthalpy of fusion distribution graph; or otherwise the enthalpy of fusion is given by integration over the enthalpy of fusion distribution curve. Preferably 5% to 35%, particularly preferably 5% to 30% and most preferably 5% to 25% of the enthalpy of fusion is in the range from 2° C. below the melting point to 2° C. above the melting point. Preferably 10% to 70%, particularly preferably 10% to 50% and most preferably 10% to 40% of the enthalpy of fusion is in the range from 4° C. below the melting point to 4° C. above the melting point. Preferably 30% to 85%, particularly preferably 30% to 75% and most preferably 30% to 65% of the enthalpy of fusion is in the range from 8° C. below the melting point to 8° C. above the melting point.

Preferably 95% to 65%, particularly preferably 95% to 70% and most preferably 95% to 75% of the enthalpy of fusion of the fatty acid vinyl ester copolymers are in a temperature range which deviates by more than 2° C. from the melting point of the fatty acid vinyl ester copolymers. Preferably 90% to 30%, particularly preferably 90% to 50% and most preferably 90% to 60% of the enthalpy of fusion of the fatty acid vinyl ester copolymers are in a temperature range which deviates by more than 4° C. from the melting point of the fatty acid vinyl ester copolymers. Preferably 70% to 15%, particularly preferably 70% to 25% and most preferably 70% to 35% of the enthalpy of fusion of the fatty acid vinyl ester copolymers are in a temperature range which deviates by more than 8° C. from the melting point of the fatty acid vinyl ester copolymers.

The weight-average molecular weight Mw of the fatty acid vinyl ester copolymers is preferably in the range of ≥5 000 g/mol, particularly preferably 5 000 g/mol to 35 000 g/mol (determination by size exclusion chromatography (SEC) against a polystyrene standard in THF, at 35° C., flow rate 0.5 ml/min and detection by RI (refractive index detector) on a Resipore column from Agilent (injection volume of 10 μl)).

The fatty acid vinyl ester copolymers are preferably in the form of solid resins. Solid resins are not generally stabilized by emulsifiers or protective colloids and accordingly not any powders re-dispersible in water. The solid resins generally consist essentially exclusively of the fatty acid vinyl ester copolymers.

The invention further relates to fatty acid vinyl ester copolymer compositions based on fatty acid vinyl ester copolymers according to the invention, with the proviso that ≤30% by weight, based on the dry weight of the fatty acid vinyl ester copolymer compositions, of fatty acid vinyl ester copolymers are present, which are based on ≥90% by weight of vinyl esters a), based on the weight of the fatty acid vinyl ester copolymers.

Consequently, the metered addition according to the invention of the vinyl esters a) or b) can be targeted to the proportion of homopolymers of the vinyl esters a) or b) in the copolymer compositions and can in addition be set very low. The formation of homopolymers can even be virtually excluded. In this context, homopolymers also include copolymers which are based largely on a single type of monomer. Owing to this metered addition according to the invention, copolymer compositions are accessible which comprise a wide variety of fatty acid vinyl ester copolymers with different incorporation rates of vinyl esters a) and b). This is advantageous for the wax properties of the copolymer compositions.

Preference is given to fatty acid vinyl ester copolymer compositions which comprise ≤20% by weight, in particular ≤10% by weight, based on the dry weight of the fatty acid vinyl ester copolymer compositions, of fatty acid vinyl ester copolymers, which are based on ≥95% by weight, in particular ≥99% by weight of vinyl esters a), based on the weight of the fatty acid vinyl ester copolymers.

Preference is also given to fatty acid vinyl ester copolymer compositions which comprise ≤30% by weight, in particular ≤20% by weight, more preferably ≤10% by weight, based on the dry weight of the fatty acid vinyl ester copolymer compositions, of fatty acid vinyl ester copolymers, which are based on ≥90% by weight, in particular ≥95% by weight, more preferably ≥99% by weight of vinyl esters b), based on the weight of the fatty acid vinyl ester copolymers.

The fatty acid vinyl ester copolymers are suitable for use, for example in coating compositions, particularly in wax compositions, for example for preparing food coatings. Wax compositions comprise one or more fatty acid vinyl ester copolymers and, for example, thickeners, softeners, surfactants, antimicrobial substances, antioxidants or fillers.

Further fields of applications are the use of the fatty acid vinyl ester copolymers as raw materials in the cosmetic or pharmaceutical field, in the paper industry or in the textile field. The fatty acid vinyl ester copolymers may also serve as wax substitutes in chewing gum raw materials. The fatty acid vinyl ester copolymers can also be used as lubricants, thickeners or for hydrophobizing surfaces.

Surprisingly, the fatty acid vinyl ester copolymers according to the invention do not tend towards separation or domain formation. The fatty acid vinyl ester copolymers exhibit wax-like properties and provide coatings after application in coating compositions which do not tend to brittleness or formation of sticky surfaces. Moreover, the fatty acid vinyl ester copolymers are amenable to simple processes using established equipment. Therefore, the fatty acid vinyl ester copolymers are ideally suited for substitution of paraffin waxes.

The following examples serve to further illustrate the invention:

General Working Procedures:

Preparation of Glass Coatings:

By pouring 5 g of polymer melt (60° C.) onto a smooth glass surface, a 1 to 2 mm thick coating was prepared and cooled to room temperature.

Preparation of Cheese Coatings:

A cheese sample (Babybel®) was dipped in a polymer melt (60° C.), subsequently allowed to drain and cooled to room temperature. In this manner, coated cheese samples were obtained in which 20 g of cheese had been coated with 4 g of polymer.

DSC Measurement:

DSC measurements and evaluations were conducted according to DIN EN ISO 11357-3 using the DSC 1 instrument from Mettler-Toledo, module type: DSC1/500 (module name: DSC1_1448)): Sample weighing: 8.5 mg, temperature range −70 to 150° C., heating/cooling rate 10K/min; 2 runs were measured (1 heating and cooling cycle per run: −70° C. (10K/min) to 150° C., 150° C. (10K/min) to −70° C.); for the evaluation in each case the $2^{nd}$ run was used.

Needle Penetration Measurement:

measurement according to ASTM D1321-10. Measuring instrument: digital semi-automatic penetrometer from Coesfeld (2.5 g hardened steel conical needle in accordance with D1321, drop rod 47.5 g, additional weight 100 g). 100 g each of the test piece was used and measured over 5 seconds. The measurement temperature is stated for the respective measurement.

Congealing Point:

determination according to ASTM D938-12.

Determination of Residual Monomer Contents:

the residual monomer contents were determined by 1H-NMR (solvent: $CDCl_3$, TMS standard 0 ppm). The integral of the triplet signal at 0.8 ppm was normalized to 300 in the integration. The relative integral of the residual monomer content at 4.5 ppm gave the residual monomer content in amount by percentage.

Preparation of the Fatty Acid Vinyl Ester Copolymers

EXAMPLE 1 (EX. 1)

Preparation of metered addition 1 (vinyl stearate solution): 150.0 g of vinyl stearate were placed in a 250 ml Schlenk flask, melted at 50° C. and degassed for 15 minutes under reduced pressure ($2.3 \times 10^{-1}$ mbar). 60 g of isopropanol were added under an argon atmosphere.

Preparation of metered addition 2 (vinyl laurate solution): 100.0 g of vinyl laurate were placed in a further 250 ml Schlenk flask and degassed at room temperature for 15 minutes under reduced pressure ($2.3 \times 10^{-1}$ mbar). 60 g of isopropanol were added under an argon atmosphere.

Preparation of metered addition 3 (initiator solution): In a 100 ml Schlenk flask were placed 60 g of isopropanol and 3.2 g of tert-butyl peroxypivalate (75% aqueous solution) under an argon countercurrent.

Performance of the Polymerization:

A 1000 ml five-necked flask was heated to 80° C. and into this was placed under an argon atmosphere 40.0 g of isopropanol and 0.8 g of tert-butyl peroxypivalate solution (75% aqueous solution) (initial charge).

After 2 minutes, metered additions 1, 2 and 3 were simultaneously started.

The initiator solution (metered addition 3) was added continuously at a metering rate of 0.5 g/min over 2 hours using an Ismatec IPC peristaltic pump.

The vinyl stearate solution (metered addition 1) was added with decreasing rate using an Ismatec peristaltic pump and the tubing was temperature controlled at 40° C. under a 250 W IR lamp. The metered addition 1 was added according to the following metering scheme: initially at 4.4 g/min for 10 min, then 3.6 g/min for 10 min, then 2.8 g/min for 10 min, then 2.4 g/min for 10 min and finally 1.0 g/min for 80 min.

The vinyl laurate solution (metered addition 2) was added via a peristaltic pump with increasing rate. The metered addition 2 was added according to the following metering scheme: initially at 1.6 g/min for 10 min, then 2.4 g/min for 10 min, then 2.8 g/min for 10 min, then 3.6 g/min for 10 min and finally 4.4 g/min for 13 min.

Subsequently, the solvent was removed under reduced pressure ($2.3 \times 10^{-1}$ mbar). This gave the fatty acid vinyl ester copolymer in the form of a colorless solid (residual monomer content <1%).

Analytical Data:

Molecular weight: Mn=3300 g/mol; Mw=6600 g/mol.

DSC: Melting temperature: 30.7° C., enthalpy of fusion 51.7 J/g (lower peak limit: −8.4° C., upper peak limit: 44.5° C.)

Enthalpy of fusion in the temperature range of +/−2° C. of the melting temperature: 9.5 J/g, which corresponds to 19% of the enthalpy of fusion of the whole melting peak. The expression +/−2° C. of the melting temperature refers to the range of 2° C. below the melting temperature to 2° C. above the melting temperature and is used analogously below.

Enthalpy of fusion in the temperature range of +/−4° C. of the melting temperature: 18.3 J/g, which corresponds to 35% of the enthalpy of fusion of the whole melting peak.

Enthalpy of fusion in the temperature range of +/−8° C. of the melting temperature: 31.6 J/g, which corresponds to 61% of the enthalpy of fusion of the whole melting peak.

Needle Penetration Measurement:

at sample specimen temperature of 22° C.: 7.8 mm;

at sample specimen temperature of 10° C.: 3.0 mm.

Congealing point: 43° C.

Glass coating: homogeneous coating.

Cheese Coating:

homogeneous coating, low temperature sensitivity. Not sticky when handled manually.

No brittleness, no surface stickiness.

COMPARATIVE EXAMPLE 2 (C.EX. 2): RANDOM COPOLYMER 40 g of vinyl laurate and 60 g of vinyl stearate were initially charged in a 250 ml three-necked flask. The monomer mixture was heated to 50° C. and degassed for 15 min under reduced pressure ($2.3 \times 10^{-1}$ mbar). 25 g of isopropanol and 0.3 g of tert-butyl peroxypivalate solution (75% solution in water) were added under an argon countercurrent. The mixture was heated (under reflux conditions) to 80° C. On reaching 80° C., a further 25 g of isopropanol together with 0.570 g of tert-butyl peroxypivalate were added dropwise via a 50 ml dropping funnel over 30 minutes. The reaction mixture was subsequently maintained at 80° C. for 2 h.

Subsequently, the solvent isopropanol was removed under reduced pressure ($2.3 \times 10^{-1}$ mbar) and 95° C.

This gave a random copolymer in the form of a colorless solid (residual monomer content <1%).

Analytical Data:

Molecular weight: Mn=10 719 g/mol; Mw=27 874 g/mol.

DSC: Melting temperature: 28.5° C., enthalpy of fusion 46.4 J/g (lower peak limit: −1.3° C., upper peak limit: 38.0° C.)

Enthalpy of fusion in the temperature range of +/−2° C. of the melting temperature: 18.1 J/g, which corresponds to 39% of the enthalpy of fusion of the whole melting peak.

Enthalpy of fusion in the temperature range of +/−4° C. of the melting temperature: 30.3 J/g, which corresponds to 65% of the enthalpy of fusion of the whole melting peak.

Enthalpy of fusion in the temperature range of +/−8° C. of the melting temperature: 39.8 J/g, which corresponds to 85.8% of the enthalpy of fusion of the whole melting peak.

Needle Penetration Measurement:

at sample specimen temperature of 22° C.: 6.5 mm;

at sample specimen temperature of 10° C.: 1.5 mm.

Congealing point: 36° C.

Glass coating: homogeneous coating.

Cheese Coating:

homogeneous coating but very temperature sensitive; was very sticky on manual handling (considerable portions melt at hand temperature).

At identical monomer composition as example 1, comparative example 2 has a distinctly narrower melting range. 65% of the total enthalpy of fusion was in a temperature window of +/−4° C., whereas in example 1 only 35% of the enthalpy of fusion was in a temperature window of +/−4° C. The product of comparative example 2 was harder at room temperature and therefore more brittle and reacted significantly more sensitively to temperature changes (the melting/crystallization process was in a narrow temperature range). For instance, on lowering the temperature it was very brittle (see needle penetration measurement at 10° C.: 1.5 mm) and on increasing the temperature it abruptly formed sticky surfaces and was liquid on further increasing the temperature (congealing temperature 36° C.)

COMPARATIVE EXAMPLE 3 (C.EX. 3)

polymer mixing of 40% by weight vinyl laurate homopolymer and 60% by weight vinyl stearate homopolymer.

Preparation of Vinyl Laurate Homopolymer:

100 g of vinyl laurate were initially charged in a 250 ml three-necked flask, heated to 50° C. and degassed under reduced pressure ($2.3 \times 10^{-1}$ mbar) for 15 minutes. Then, 25 g of isopropanol and 0.3 g of tert-butyl peroxypivalate (75% solution in water) were added in one shot under an argon countercurrent. The mixture was heated (reflux) to a reaction temperature of 80° C. On reaching 80° C., a further 25 g of isopropanol together with 0.7 g of tert-butyl peroxypivalate were added dropwise via a 50 ml dropping funnel over 45 minutes. The reaction mixture was subsequently maintained at 80° C. for 2 h. Subsequently, the isopropanol solvent was removed under reduced pressure ($2.3 \times 10^{-1}$ mbar) and 95° C. This gave a cloudy, highly viscous liquid (residual monomer content <1%).

Molecular weight: Mn=12 828 g/mol; Mw=32 280 g/mol.

Preparation of the Vinyl Stearate Homopolymer:

100 g of vinyl stearate were initially charged in a 250 ml three-necked flask, heated to 50° C. and degassed under reduced pressure ($2.3 \times 10^{-1}$ mbar) for 15 minutes. Then, 25 g of isopropanol and 0.28 g of tert-butyl peroxypivalate (75% solution in water) were added in one shot under an argon countercurrent. The mixture was heated (reflux) to a reaction temperature of 80° C. On reaching 80° C., a further 25 g of isopropanol together with 0.45 g of tert-butyl peroxypivalate were added dropwise via a 50 ml dropping funnel over 30 minutes. The reaction mixture was subsequently maintained at 80° C. for 2 h. Subsequently, the isopropanol solvent was removed under reduced pressure ($2.3 \times 10^{-1}$ mbar) and 95° C. This gave a colorless solid.

Molecular weight: Mn=15 170 g/mol; Mw=29 427 g/mol.

Mixing of the Two Homopolymers:

20 g of the vinyl laurate homopolymer described above and 30 g of the vinyl stearate homopolymer described above were weighed into a 50 ml glass vial and mixed homogeneously as melts by stirring at 60° C.

DSC: melt diagram: two baseline separated melt regions, two melt peaks:

melt peak 1:

melting temperature: 53.6° C., enthalpy of fusion: 53.0 J/g (lower peak limit 11.6° C., upper peak limit 61.8° C.);

melt peak 2:

melting temperature: −2.56° C., enthalpy of fusion: 10.7 J/g.

Enthalpy of fusion in the temperature range of +/−2° C. of the melting temperature: 33.5 J/g, which corresponds to 62% of the enthalpy of fusion of the whole melting peak.

Enthalpy of fusion in the temperature range of +/−4° C. of the melting temperature: 41.8 J/g, which corresponds to 78% of the enthalpy of fusion of the whole melting peak.

Enthalpy of fusion in the temperature range of +/−8° C. of the melting temperature: 47.7 J/g, which corresponds to 89.0% of the enthalpy of fusion of the whole melting peak.

Needle Penetration Measurement:
at sample specimen temperature of 22° C.; 3.9 mm;
at sample specimen temperature of 10° C.: 3.4 mm.
Glass coating: crack formation.
Cheese coating: crack formation.

The coatings were fragile, brittle and also have a high surface stickiness. In addition, the different constituents of the coatings were incompatible with one another.

COMPARATIVE EXAMPLE 4 (C.EX. 4): TWO-STAGE HOMOPOLYMERIZATION 100 g of vinyl stearate were initially charged in a 500 ml three-necked flask, heated to 50° C. and degassed under reduced pressure ($2.3 \times 10^{-1}$ mbar) for 15 minutes. Then, 0.28 g of tert-butyl peroxypivolate (75% solution in water) were added in one shot under an argon countercurrent. The mixture was heated (reflux) to a reaction temperature of 80° C. On reaching 80° C., a further 0.45 g of tert-butyl peroxypivalate were added dropwise over 30 minutes. On reaching a residual monomer content of 10% (amount of vinyl stearate corresponded to 10% of the starting value), 40 g of degassed vinyl laurate were added in one shot under an argon atmosphere. Tert-butyl peroxypivalate was replenished until the residual monomer content was less than 1%. This gave a colorless solid.

DSC: melt diagram: two baseline separated melt regions, two melt peaks:
melt peak 1:
melting temperature: 51.6° C., enthalpy of fusion: 44.1 J/g (lower peak limit 20.7° C., upper peak limit 58.6° C.);
melt peak 2:
melting temperature: −1.3° C., enthalpy of fusion: 9.5 J/g.

Enthalpy of fusion in the temperature range of +/−2° C. of the melting temperature: 26.0 J/g, which corresponds to 44% of the enthalpy of fusion of the whole melting peak.

Enthalpy of fusion in the temperature range of +/−4° C. of the melting temperature: 34.1 J/g, which corresponds to 77% of the enthalpy of fusion of the whole melting peak.

Enthalpy of fusion in the temperature range of +/−8° C. of the melting temperature: 39.6 J/g, which corresponds to 90.0% of the enthalpy of fusion of the whole melting peak.

Needle Penetration Measurement:
at sample specimen temperature of 22° C.: 5.4 mm;
at sample specimen temperature of 10° C.: 3.4 mm.
Glass coating: crack formation;
Cheese coating: crack formation.

The melting and coating characteristics of the polymer obtained corresponded to comparative example 3.

The invention claimed is:

1. A method for preparing fatty acid vinyl ester copolymers by free-radical initiated polymerization of
    a) one or more vinyl esters of carboxylic acids having 16 to 22 carbon atoms and
    b) one or more vinyl esters of carboxylic acids having 2 to 15 carbon atoms,
    wherein the one or more vinyl esters a) and the one or more vinyl esters b) are metered in during the polymerization, and
    during the polymerization either a metered addition rate of vinyl ester a) or a metered addition rate of vinyl ester b) is reduced and the metered addition rate of the other of the two vinyl esters a) or b) is increased.

2. The method for preparing fatty acid vinyl ester copolymers as claimed in claim 1, wherein the one or more vinyl esters a) are vinyl esters of carboxylic acids selected from the group consisting of palmitic acid, stearic acid, margaric acid, arachidic acid and behenic acid and/or the one or more vinyl esters b) are members selected from the group consisting of vinyl acetate, vinyl propionate, vinyl butyrate, 1-methylvinyl acetate, vinyl pivalate, vinyl laurate, vinyl neodecanoate and vinyl esters of α-branched monocarboxylic acids having 9 to 11 carbon atoms.

3. The method for preparing fatty acid vinyl ester copolymers as claimed in claim 1, wherein the vinyl esters a) are used from 20 to 90% by weight and/or the vinyl esters b) are used from 10 to 80% by weight, based in each case on a total mass of a sum total of ethylenically unsaturated monomers used for preparing the fatty acid vinyl ester copolymers.

4. The method for preparing fatty acid vinyl ester copolymers as claimed in claim 1, wherein the metered addition of the vinyl esters a) and/or vinyl esters b) is carried out continuously.

5. The method for preparing fatty acid vinyl ester copolymers as claimed in claim 1, wherein 15 to 50% by weight of a total vinyl esters V1) used have been metered in up to a time point at which 1 to 10% of a total vinyl esters V2) used have been metered in; and/or
    30 to 70% by weight of the total vinyl esters V1) used have been metered in up to a time point at which 20 to 30% by weight of the total vinyl esters V2) used have been metered in; and/or
    40 to 80% by weight of the total vinyl esters V1) used have been metered in up to a time point at which 40 to 60% by weight of the total vinyl esters V2) used have been metered in; and/or
    50 to 80% by weight of the total vinyl esters V1) used have been metered in up to a time point at which 60 to 70% by weight of the total vinyl esters V2) used have been metered in, wherein vinyl ester V1 is the vinyl ester a) or b) whose metered addition rate is reduced during the polymerization, and
    vinyl ester V2 is the vinyl ester a) or b) whose metered addition rate is increased during the polymerization.

6. The method for preparing fatty acid vinyl ester copolymers as claimed in claim 1, wherein 70 to 100% by weight of a total vinyl esters V1) used are metered in while vinyl esters V2) are metered in, and/or 80 to 100% by weight of a total vinyl esters V2) used are metered in while vinyl esters V1) are metered in, wherein vinyl ester V1 is the vinyl ester a) or b) whose metered addition rate is reduced during the polymerization, and
    vinyl ester V2 is the vinyl ester a) or b) whose metered addition rate is increased during the polymerization.

7. The method for preparing fatty acid vinyl ester copolymers as claimed in claim 5, wherein vinyl ester V1) is the vinyl ester a) and vinyl ester V2) is the vinyl ester b).

8. A fatty acid vinyl ester copolymer obtained by free-radical initiated polymerization of
    a) one or more vinyl esters of carboxylic acids having 16 to 22 carbon atoms and
    b) one or more vinyl esters of carboxylic acids having 2 to 15 carbon atoms, wherein:

(i) the one or more vinyl esters a) and the one or more vinyl esters b) are metered in during the polymerization;

(ii) during the polymerization either a metered addition rate of vinyl esters a) or a metered addition rate of vinyl esters b) is reduced and the metered addition rate of the other of the two vinyl esters a) or b) is increased;

(iii) 15 to 50% by weight of total vinyl esters V1) used are metered in up to a time point at which 1 to 10% of total vinyl esters V2) used are metered in; and/or 30 to 70% by weight of the total vinyl esters V1) used are metered in up to a time point at which 20 to 30% by weight of the total vinyl esters V2) used are metered in;

(iv) the one or more vinyl esters a) or b), whose metered addition rate is reduced during the polymerization, is referred to as vinyl ester V1) and the one or more vinyl esters a) or b), whose metered addition rate is increased during the polymerization, is referred to as vinyl ester V2); and (v) the fatty acid vinyl ester copolymer is a gradient polymer comprising a gradient in a distribution of units of vinyl esters a) and vinyl esters b) along a polymer chain thereof.

9. The fatty acid vinyl ester copolymer as claimed in claim 8, wherein a melting point and an enthalpy of fusion of the fatty acid vinyl ester copolymer meet one or more of the following criteria:

a) 5% to 35% of the enthalpy of fusion is in a range from 2° C. below the melting point to 2° C. above the melting point;

b) 10% to 70% of the enthalpy of fusion is in a range from 4° C. below the melting point to 4° C. above the melting point;

c) 30% to 85% of the enthalpy of fusion is in a range from 8° C. below the melting point to 8° C. above the melting point;

where the melting point and the enthalpy of fusion are determined according to DIN EN ISO 11357-3.

10. The fatty acid vinyl ester copolymer as claimed in claim 8, wherein a melting point and an enthalpy of fusion of the fatty acid vinyl ester copolymer meet one or more of the following criteria:

a) 95% to 65% of the enthalpy of fusion of the fatty acid vinyl ester copolymers are in a temperature range which deviates by more than 2° C. from the melting point of the fatty acid vinyl ester copolymers;

b) 90% to 30% of the enthalpy of fusion of the fatty acid vinyl ester copolymers are in a temperature range which deviates by more than 4° C. from the melting point of the fatty acid vinyl ester copolymers;

c) 70% to 15% of the enthalpy of fusion of the fatty acid vinyl ester copolymers are in a temperature range which deviates by more than 8° C. from the melting point of the fatty acid vinyl ester copolymers;

where the melting point and the enthalpy of fusion are determined according to DIN EN ISO 11357-3.

11. Fatty acid vinyl ester copolymer compositions based on fatty acid vinyl ester copolymers as claimed in claim 8, with the proviso that ≤30% by weight, based on a dry weight of the fatty acid vinyl ester copolymer composition, of the fatty acid vinyl ester copolymers are present, which are based on ≥90% by weight of vinyl esters a), based on a weight of the fatty acid vinyl ester copolymers.

12. A coating method comprising coating a material with the fatty acid vinyl ester copolymer of claim 8.

13. A preparation method comprising using the fatty acid vinyl ester copolymer of claim 8 as an additive for cosmetic or pharmaceutical products, for paper coating compositions, as a wax substitute in chewing gum raw materials or as a lubricant, a thickener, or for hydrophobizing surfaces.

14. The method for preparing fatty acid vinyl ester copolymers as claimed in claim 2, wherein the vinyl esters a) are used from 20 to 90% by weight and/or the vinyl esters b) are used from 10 to 80% by weight, based in each case on a total mass of a sum total of ethylenically unsaturated monomers used for preparing the fatty acid vinyl ester copolymers.

15. The method for preparing fatty acid vinyl ester copolymers as claimed in claim 14, wherein the metered addition of the vinyl esters a) and/or vinyl esters b) is carried out continuously.

16. The method for preparing fatty acid vinyl ester copolymers as claimed in claim 15, wherein 15 to 50% by weight of a total vinyl esters V1) used have been metered in up to a time point at which 1 to 10% of a total vinyl esters V2) used have been metered in; and/or 30 to 70% by weight of the total vinyl esters V1) used have been metered in up to a time point at which 20 to 30% by weight of the total vinyl esters V2) used have been metered in; and/or 40 to 80% by weight of the total vinyl esters V1) used have been metered in up to a time point at which 40 to 60% by weight of the total vinyl esters V2) used have been metered in; and/or 50 to 80% by weight of the total vinyl esters V1) used have been metered in up to a time point at which 60 to 70% by weight of the total vinyl esters V2) used have been metered in, wherein vinyl ester V1 is the vinyl ester a) or b) whose metered addition rate is reduced during the polymerization, and vinyl ester V2 is the vinyl ester a) or b) whose metered addition rate is increased during the polymerization.

17. The method for preparing fatty acid vinyl ester copolymers as claimed in claim 16, wherein 70 to 100% by weight of a total vinyl esters V1) used are metered in while vinyl esters V2) are metered in, and/or 80 to 100% by weight of a total vinyl esters V2) used are metered in while vinyl esters V1) are metered in.

18. The method for preparing fatty acid vinyl ester copolymers as claimed in claim 17, wherein vinyl ester V1) is the vinyl ester a) and vinyl ester V2) is the vinyl ester b).

* * * * *